United States Patent
Huang

(10) Patent No.: US 8,210,696 B2
(45) Date of Patent: Jul. 3, 2012

(54) ANGLE-ADJUSTABLE AUXILIARY VEHICLE MIRROR

(76) Inventor: Wen Huang, Tainan (TW)

( * ) Notice: Subject to any disclaimer, the term of this patent is extended or adjusted under 35 U.S.C. 154(b) by 435 days.

(21) Appl. No.: 12/583,741

(22) Filed: Aug. 26, 2009

(65) Prior Publication Data

US 2011/0051271 A1    Mar. 3, 2011

(51) Int. Cl.
*G02B 7/182* (2006.01)
*A47G 1/24* (2006.01)
*B60R 1/02* (2006.01)

(52) U.S. Cl. ........................................ 359/872; 248/482

(58) Field of Classification Search .................. 359/872, 359/876; 248/482
See application file for complete search history.

(56) References Cited

U.S. PATENT DOCUMENTS 5,363,246 A * 11/1994 Perry et al. .................... 359/874
6,979,092 B2 * 12/2005 Liang ............................ 359/876

* cited by examiner

*Primary Examiner* — Alessandro Amari

(57) ABSTRACT

An angle-adjustable auxiliary vehicle mirror includes a base and a mirror. The base has a concave rest with a threaded hole. The mirror fits in a concave chamber of the base, with an auxiliary lens combined on top, having an arc-shaped convex formed at the bottom to engage with the concave rest. An opening is bored in the arc-shaped convex. A washer with a through hole is put on the arc-shaped convex. A screw is orderly inserted through the through hole and the opening to engage with the threaded hole to keep the mirror positioned, with the arc-shaped convex contacting with the concave rest. With the screw not tightly engaged with the mirror, the arc-shaped convex can axially slide on the concave rest to alter the angle of the mirror.

3 Claims, 3 Drawing Sheets

ANGLE-ADJUSTABLE AUXILIARY VEHICLE MIRROR

BACKGROUND OF THE INVENTION

1. Field of the Invention

This invention relates to an auxiliary vehicle mirror, particularly to one able to diversely change view angle so as to avoid any visional dead space.

2. Description of the Prior Art

Commonly, an angle-adjustable auxiliary vehicle mirror is securely helpful to a traveling car. Such relevant angle-adjustable auxiliary vehicle mirrors include those disclosed in Taiwan Patent No. 427264, 252414, 269261 and 261970 etc. The present invention offers a kind of angle-adjustable auxiliary vehicle mirror as well.

SUMMARY OF THE INVENTION

The object of this invention is to offer an angle-adjustable auxiliary vehicle mirror with an inventive and novel structure.

The main characteristics of the invention are a base and a mirror. The base is provided with a concave rest formed spherical above the center with a threaded hole bored in the center. The mirror is fitted in a concave chamber of the base, with an auxiliary lens combined on the top, provided with an arc-shaped convex formed at the bottom to engage with the concave rest. An opening is bored centrally in the arc-shaped convex, with a diameter larger than that of the threaded hole. A washer with a through hole is put on the arc-shaped convex. A screw is orderly inserted through the through hole of the washer and the opening of the mirror to engage with the threaded hole of the base to keep the mirror combined with the base, so as to enable the arc-shaped convex to contact with the concave rest. With the screw not tightly engaged with the mirror, the arc-shaped convex can be supported by the concave rest to axially slide thereon to alter the angle of the mirror. Therefore, owing to a spherical contact between the arc-shaped convex and the concave rest, a view angle can be diversely altered by pressing down any spot of the circumference of the auxiliary lens.

BRIEF DESCRIPTION OF DRAWINGS

This invention is better understood by referring to the accompanying drawings, wherein.

DETAILED DESCRIPTION OF THE PREFERRED EMBODIMENT

Figure 1:
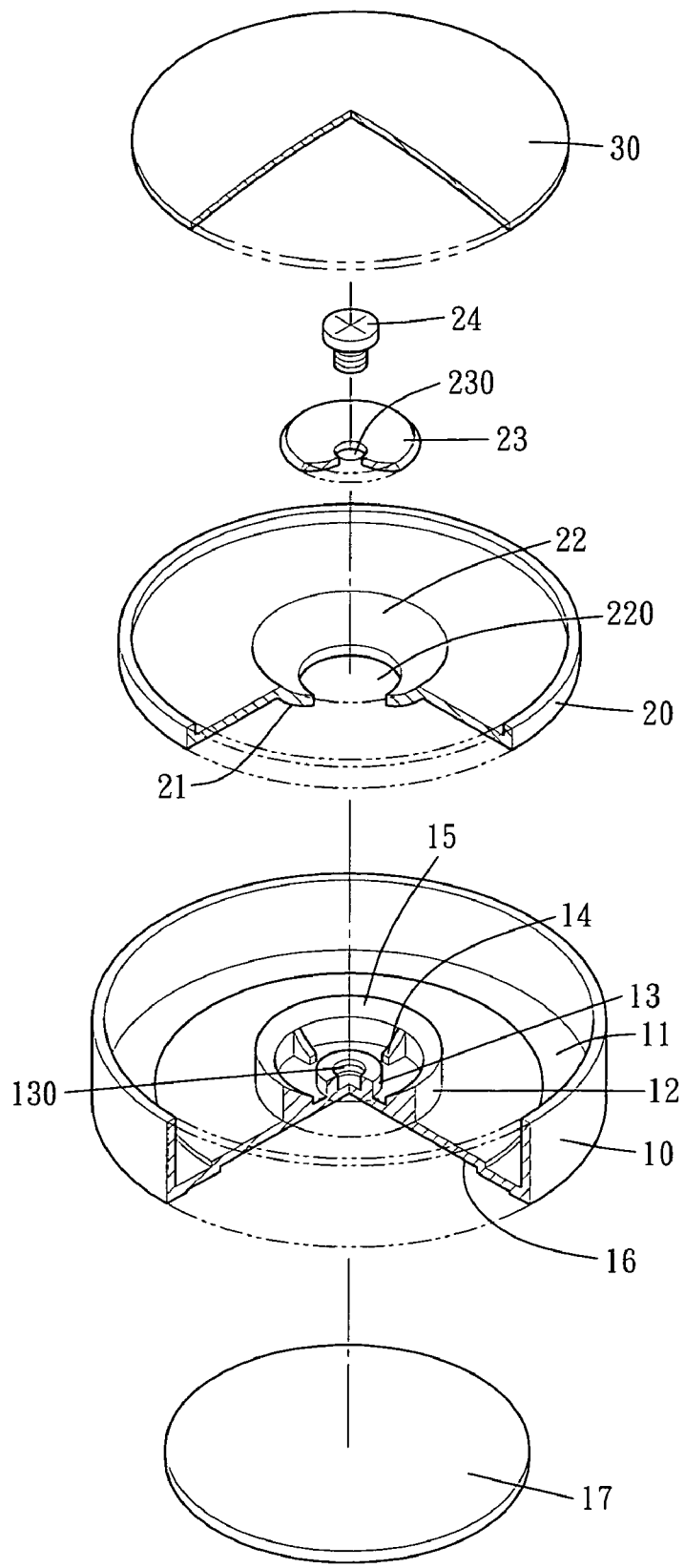
FIG. 1 is a partial exploded perspective view of a preferred embodiment of an angle-adjustable auxiliary vehicle mirror in the present invention.
Figure 3:
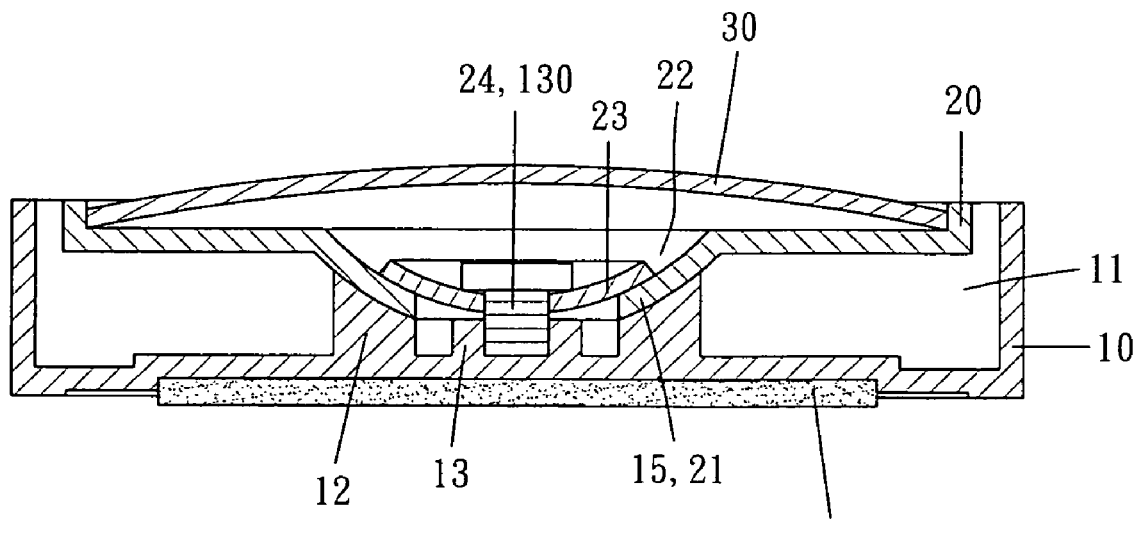
FIG. 3 is a cross-sectional view of the preferred embodiment of an angle-adjustable auxiliary vehicle mirror in the present invention.

As shown in FIGS. 1 and 3, a preferred embodiment of an angle-adjustable auxiliary vehicle mirror in the present invention includes a base 10 and a mirror 20.

The base 10 is provided with a concave chamber 11 formed interiorly, an outer projected annular wall 12 located around the center of the concave chamber 11 with a proper radius, and an inner projected annular wall 13 located concentrically inside the outer projected annular wall 12 with a height lower than that of the outer projected annular wall 12. Connected between the outer projected annular wall 12 and the inner projected annular wall 13 are a plurality of ribs 14 spaced apart equidistantly, and a concave rest 15 shaped spherical with a lower center is formed above the outer projected annular wall 12, the inner projected annular wall 13 and the ribs 14. The inner projected annular wall 13 has a center threaded hole 130. In addition, the base 10 is provided with a groove 16 formed in the bottom for fitting a double coated member 17.

Figure 2:
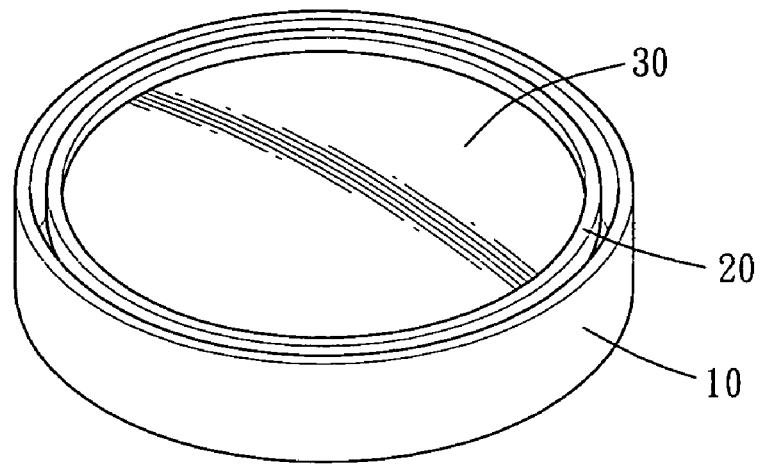
FIG. 2 is a perspective view of the preferred embodiment of an angle-adjustable auxiliary vehicle mirror in the present invention.

The mirror 20 is fitted in the concave chamber 11 of the base 10, with an auxiliary lens 30 combined on the top. The mirror 20 is provided with an arc-shaped convex 21 extended downward from the bottom to engage with the concave rest 15 of the base 10, with the arc-shaped convex 21 having an outside diameter larger than the inside diameter of the concave rest 15. Formed in the top of the arc-shaped convex 21 is an arc-shaped groove 22, which is provided with an opening 220 bored centrally with a preset diameter larger than that of the threaded hole 130. The mirror 20 is also provided with an arc-shaped washer 23 that has a larger diameter than that of the arc-shaped groove 22, employed to fit in the arc-shaped groove 22. Bored centrally in the arc-shaped washer 23 is a through hole 230. A screw 24 is provided to orderly pass through the through hole 230 of the arc-shaped washer 23 and the opening 220 of the arc-shaped groove 22 to engage with the threaded hole 130 of the inner projected annular wall 13 of the base 10, so as to keep the mirror 20 positioned, with the arc-shaped convex 21 contacting spherically with the concave rest 15 of the base 10, as shown in FIGS. 2 and 3.

Figure 4:
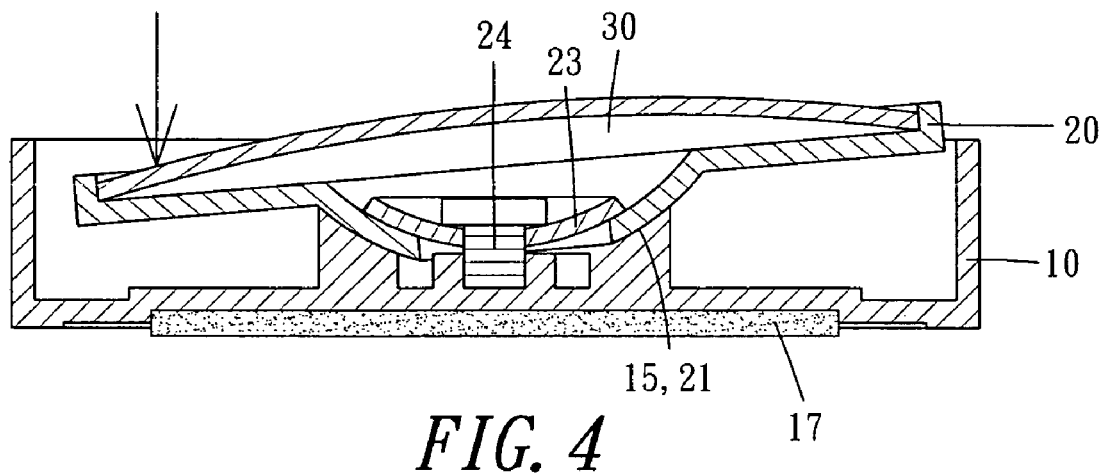
FIG. 4 is a cross-sectional view of the preferred embodiment of an angle-adjustable auxiliary vehicle mirror in the present invention, showing it being adjusted to make an auxiliary lens turned to a certain angle.
Figure 5:
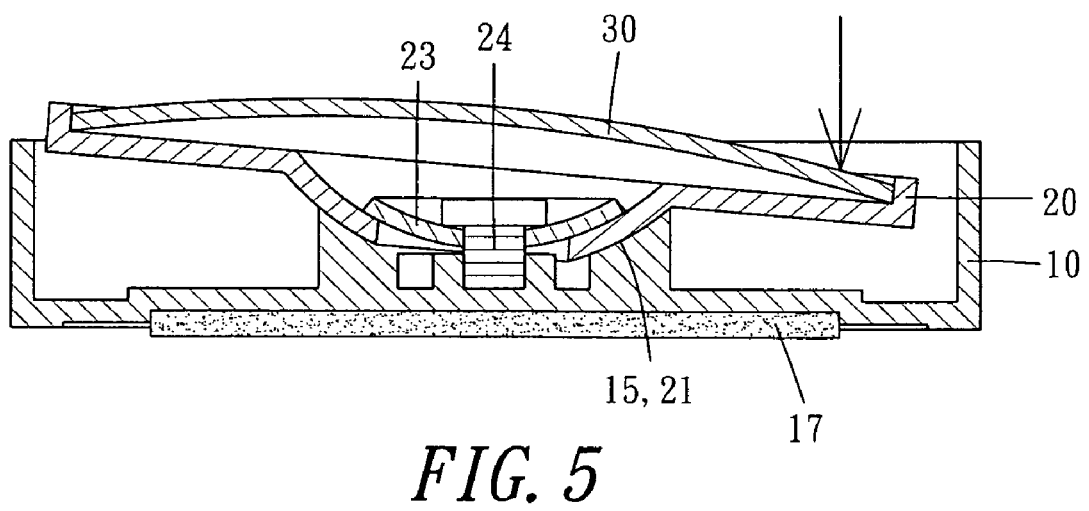
FIG. 5 is a cross-sectional view of the preferred embodiment of an angle-adjustable auxiliary vehicle mirror in the present invention, showing it being adjusted to make the auxiliary lens turned to another angle.

As the screw 24 is not tightly engaged with the mirror 20, the arc-shaped convex 21 can thus be supported by the concave rest 15 of the base 10 to axially slide thereon to alter the angle of the mirror 20. And, owing to a spherical contact between the arc-shaped convex 21 of the mirror 20 and the concave rest 15 of the base 10, a view angle can be diversely altered by pressing down any spot of the circumference of the auxiliary lens 30, as shown in FIGS. 4 and 5.

With the present angle-adjustable auxiliary vehicle mirror providing a wide range of a view angle, a driver can drive a car securely.

While the preferred embodiment of the invention has been described above, it will be recognized and understood that various modifications may be made therein and the appended claims are intended to cover all such modifications that may fall within the spirit and scope of the invention.

What is claimed is:

1. An angle-adjustable auxiliary vehicle mirror comprising:

a base provided with a concave chamber formed interiorly, a concave rest formed spherical above a center of said concave chamber and having a lower center, a threaded hole formed in a center of said concave rest;

a mirror fitted in said concave chamber of said base with a top combined with an auxiliary lens and provided with an arc-shaped convex extended downward from a central bottom to engage with said concave rest, an opening bored centrally in said arc-shaped convex with a diameter larger than that of said threaded hole, an arc-shaped washer installed on said arc-shaped convex and bored centrally with a through hole, a screw provided to orderly pass through said through hole of said arc-shaped washer and said opening of said arc-shaped convex to engage with said threaded hole of said base to keep said mirror combined with said base so that said arc-shaped convex can spherically contact with said concave rest of said base; and having said screw not tightly engaged with said mirror so that said arc-shaped convex can be supported by said concave rest of said base to axially slide thereon to alter an angle of said mirror, a view angle of said auxiliary mirror able to be diversely changed by pressing down any spot of a circumference of said auxiliary lens.

2. The angle-adjustable auxiliary vehicle mirror as claimed in claim 1, wherein said base is further provided with an outer projected annular wall located around a center with a proper radius, an inner projected annular wall located concentrically inside said outer projected annular wall with a height lower than that of said outer projected annular wall, a plurality of ribs connected between said inner projected annular wall and said outer projected annular wall, said concave rest of said base formed above said outer projected annular wall and said inner projected annular wall and said ribs.

3. The angle-adjustable auxiliary vehicle mirror as claimed in claim 1, wherein said arc-shaped convex of said mirror has an outside diameter larger than an inside diameter of said concave rest, an arc-shaped groove form in a top of said arc-shaped convex for fitting said arc-shaped washer.

* * * * *